(12) United States Patent
Nichols et al.

(10) Patent No.: US 8,244,764 B2
(45) Date of Patent: Aug. 14, 2012

(54) STASHING OF LOCALLY PERSISTED DATA TO NETWORK ACCESSIBLE STORAGE

(75) Inventors: David A. Nichols, Redmond, WA (US); Catherine C Marshall, San Francisco, CA (US); John D. Mehr, Kenmore, WA (US); Elissa E. S. Murphy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 315 days.

(21) Appl. No.: 12/533,349

(22) Filed: Jul. 31, 2009

(65) Prior Publication Data

US 2011/0029586 A1 Feb. 3, 2011

(51) Int. Cl.
 *G06F 17/00* (2006.01)
(52) U.S. Cl. ........ 707/791; 707/795; 707/807; 707/809; 707/999.107
(58) Field of Classification Search .................. 707/791, 707/795, 807, 809, 999.107
See application file for complete search history.

(56) References Cited

U.S. PATENT DOCUMENTS

| | | | |
|---|---|---|---|
| 6,032,227 A * | 2/2000 | Shaheen et al. | 711/129 |
| 6,226,759 B1 | 5/2001 | Miller et al. | |
| 6,535,997 B1 | 3/2003 | Janson et al. | |
| 6,948,038 B2 | 9/2005 | Berkowitz et al. | |
| 7,287,047 B2 | 10/2007 | Kavuri | |
| 7,418,619 B1 | 8/2008 | Uhlmann et al. | |
| 7,461,144 B1 | 12/2008 | Beloussov et al. | |
| 2006/0150085 A1 | 7/2006 | Davis et al. | |
| 2006/0195783 A1 | 8/2006 | Davis et al. | |
| 2007/0286099 A1 | 12/2007 | Stocklein et al. | |
| 2008/0163234 A1 | 7/2008 | Stronge et al. | |
| 2009/0037660 A1 * | 2/2009 | Fairhurst | 711/129 |

OTHER PUBLICATIONS

Symantec Corporation, "Symantec Enterprise Vault", Data Sheet: Archiving, 2008, 6 pages, downloaded Dec. 2009 from http://eval.symantec.com/mktginfo/enterprise/fact_sheets/b-datasheet-enterprise_vault_09-2008_14524677-1.en-us.pdf.
"Backup & Restore" for symbian OS applications, retrieved on Jan. 6, 2009 at <<http://celluleus.blogspot.com/2008/03/backup-restore-for-symbian-os.html>>, Monday, Mar. 3, 2008, 2 pages.
Moodalbail, et al., "Backup Aware Object based Storage", retrieved on Jan. 6, 2009 at <<http://www.dtc.umn.edu/publications/reports/2007_25.pdf>>, DTC Intelligent Storage Consortium (DISC), 6 pages.
Newby, "PC Connectivity: How to Write Backup Aware Software for Symbian OS v9", retrieved on Jan. 6, 2009 at <<http://developer.symbian.com/main/downloads/papers/pc_connectivity/PlatSec_PC_Connectivity.pdf>>, Revision 1.4, Jun. 2006, 21 pages.

* cited by examiner

*Primary Examiner* — Sana Al Hashemi
(74) *Attorney, Agent, or Firm* — Lee & Hayes, PLLC

(57) ABSTRACT

Techniques are disclosed for identifying and stashing all or portions of application data to a network accessible storage device or location. Identifying and stashing are accomplished in a fashion that is transparent to a user such that a user is not burdened by the process of managing and stashing a full or partial set of application data. The system, the application, or a combination of system components and the application persist and manage data locally and stash portions of the local data to one or more network accessible storage devices or locations. One or more links are provided in place of the stashed portions of data. The application uses the links in a same or similar fashion as handling local data while providing little to no loss of functionality due to all or portions of the local data being stashed.

20 Claims, 4 Drawing Sheets

STASHING OF LOCALLY PERSISTED DATA TO NETWORK ACCESSIBLE STORAGE

BACKGROUND

Despite advances in computing and programming, for a particular software application, managing and storing data generally fall into two somewhat mutually exclusive paradigms. In one paradigm, data is managed at some level of granularity within a single file. For example, information is placed within cells of a spreadsheet and the spreadsheet is stored as a single file on a local machine. In another example, words and paragraphs are managed and stored within a single word processing document on a local machine or at least on a single machine even if stored at some location in a network.

In a second general paradigm, data is managed and stored across a network. For example, a file system allows a user or program to manage and store files, either singly or in groups, in one or more locations or devices in the network. In another example, a program gathers and stores data in a real time database which may be stored on a single machine or may be spread over multiple systems or machines interconnected by a network. In the second paradigm, often one application communicates with another application (e.g. database application) where the other application then manages and persists the data.

In both data management and data storing paradigms, backing up of data can be done by another unrelated application or function by an application with the sole and specific task of backing up data. For example, in the first paradigm, files are copied to another location either to a location on the same physical machine or to another machine or device. In the second paradigm, a system administrator performs a backup. In such a situation, such as in the backup of a database, the primary system or application can be shutdown or brought offline when the task of backing up is performed. In other situations, the primary system or application experiences an unusually high load as a backup function is performed, which sometimes causes interference with normal operation of the system or the application, or both the system and the application. In both paradigms, large portions of the data being backed up have not been changed since a previous backup which results in a risk that data and files may be stored multiple times across multiple backups and transferred multiple times.

Further, user data accumulates over time. For example, users tend to keep email messages and add to their collection of digital photographs. They hang onto their music files, video files, bookmarks and other various forms of data. Software applications tend to increasingly become sluggish as they become overwhelmed by these increasing collections of data. In the workplace, users hit or exceed their respective quotas of disk space or file size limits for certain applications. Archiving, auto-archiving, compression and automated garbage collection only go so far in managing such data. Application and machine performance sometimes degrades to such a degree that some users wipe their machines clean only to end up back at the same place in a few months.

SUMMARY

Techniques are described for facilitating an application to more effectively manage its corresponding application data. In particular, techniques are described for identifying and stashing portions of application data to a network accessible storage (NAS) location or device. Identifying and stashing are accomplished in a transparent fashion such that a user is not burdened by the process of managing and creating a full or partial backup of application data. The system, the application, or a combination of system components and the application persist and manage data locally and stash portions of the local data to one or more NAS devices or locations. One or more data links are provided in place of the stashed portions of data. The application is able to use the data links in a same or similar way as handling local data while providing little to no loss of functionality due to portions of the local data being remotely stashed.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
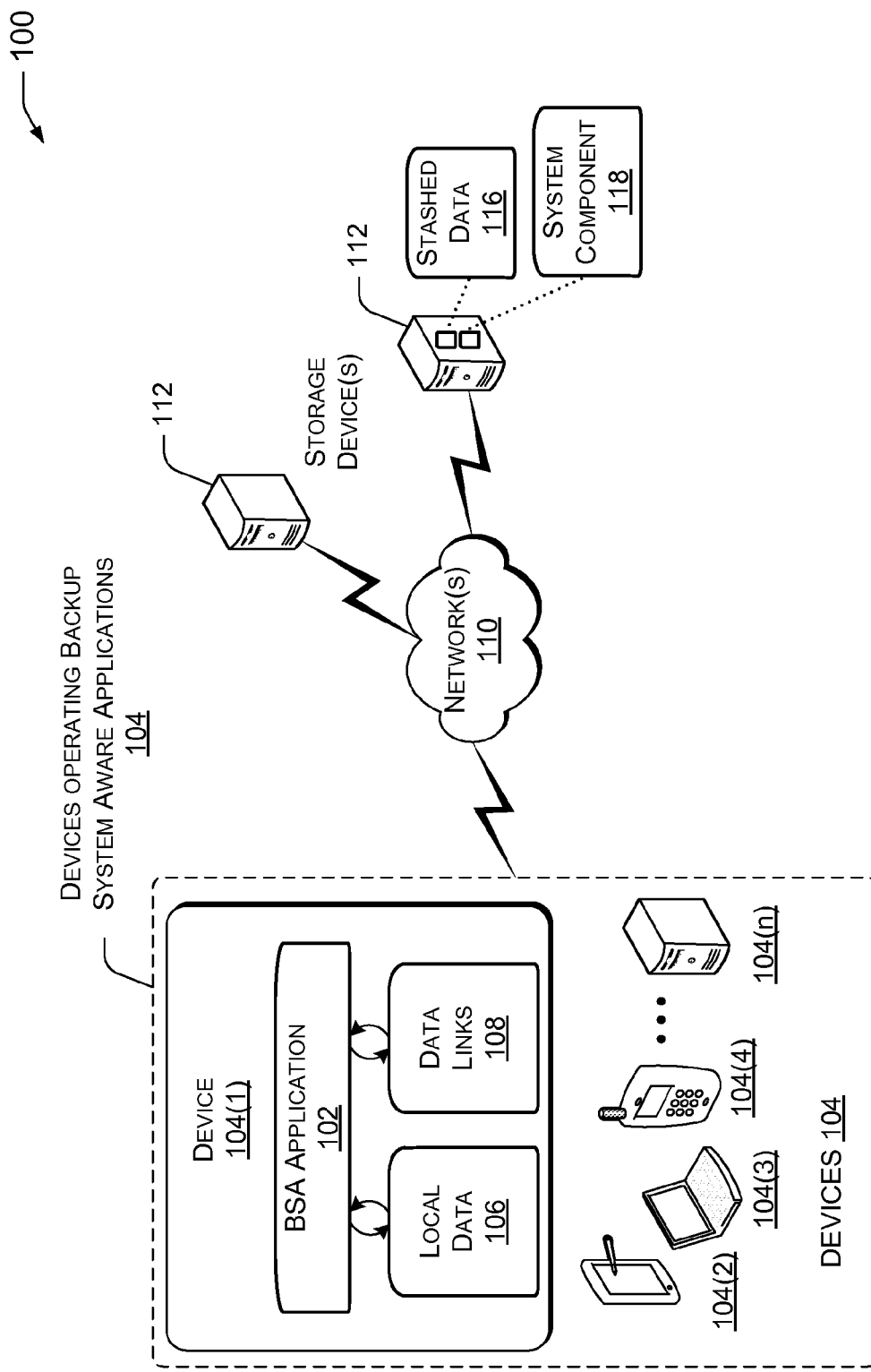
FIG. 1 shows an overview of an exemplary system wherein backup system aware applications operate and stash data across a network onto one or more network accessible storage devices.

What has been needed is a software application or system that can determine which data to store locally and which data to offload to another accessible location. Hence, what is needed is intelligent management and persistence of data at the level of the application instead of the use of another specialized application or some separate specialized task such as an archiving task or auto-archiving function. Auto-archiving, as used herein, merely moves data into another local file on the same device and treats the auto-archived data separately from active data, such as by placing it in a separate folder with an archive label. Further, data that is auto-archived is deleted from the pool of active application data. Auto-archiving, as used herein, is based merely on just one characteristic of data—its date and/or time of, for example, creation, last change or last access.

This disclosure discusses applications and a system with the ability to more intelligently manage persisted application data. For purposes of illustration only, these features are discussed in the context of exemplary applications operating on a computing device where the computing device is in electronic connection with one or more network accessible storage (NAS) locations or devices.

The exemplary applications, system and system components described herein identify and stash portions of application data to a network accessible storage (NAS) location or device (which some may describe as "the cloud").

Locally persisted data includes data persisted on a local device, such as a portable device, personal computer or other device that is accessible to a user and that is on a network. The user need not be aware of the on-going data identification and stashing. As such, the user is not burdened by the process of managing and creating a full or partial backup of application data. Links to the stashed data are provided in place of the stashed portions of data. The exemplary applications, system and system components described herein are able to use the data links in a same or similar way as handling local data while providing little to no loss of functionality due to portions of the local data being remotely stashed. While data is discussed, stashing of data is merely exemplary of principles which also can be applied to a variety of entities including applications as well. That is, an application may be segmented in such a way that only the portion of the application that is used most is stored locally; the rest of the executable—e.g. portions representing features that are used less frequently—may be stashed remotely.

The exemplary applications, system components and system can handle a data load that escalates relatively slowly or rapidly. Accordingly, stashing of data may be performed at a frequency related to the rate of escalating application data. Such an application maintains access to stashed data. Attributes or characteristics of application data are used, either by the applications or some other component of the system, to determine what application data is best to stash. Data elements are passed to one or more NAS locations or devices and one or more corresponding data links are passed back to the backup system aware application. The data items selected for transfer may be selected based on one or more factors such as a cost of transferring a certain volume of data across a network, a cost of a certain amount of data storage space on the device operating the applications, and a frequency of how often the data items are accessed. The benefits include increased volume of freed space on the local device operating the applications.

System Overview

FIG. 1 shows an overview of an illustrative system 100 within which these techniques may be implemented. FIG. 1 shows a backup system aware (BSA) application 102 operating on an exemplary device 104(1). Various types of devices that operate BSA applications may be used in the system 100. Such devices include a personal digital assistant 104(2), a personal computer 104(3), a mobile telephone 104(4), and a desktop computer 104(n).

Any particular BSA application 102 accesses local data 106 and data links 108 where the links refer to and uniquely identify data that has been moved across a network 110 to one or more other locations or devices such as NAS devices 112. The process of identifying and moving certain data across one or more networks 110 is presented in more detail below.

A BSA application 102 can handle an ever increasing amount of or even a rapidly escalating amount of local data 106. The BSA application 102 is aware of and has access to the various components of the system 100. The BSA application 102 uses these components to intelligently pass some, most or all of the local data 106 to a storage device 112. Then, the BSA application 102 acquires one or more data links 108 and replaces local data 106 with data links 108. The BSA application 102 uses the data links 108 in the same or similar way that it uses other local data 106.

In one implementation, the BSA application 102 passes attributes or characteristics of local data 106 within a local dataset to one or more components of the system 100. A service (not shown) or some other component of the system 100 determines what local data 106 or portions of local data 106 to back up or stash in one or more of the storage devices 112. Local data 106 which has been backed up or stashed away is referred to herein as stashed data 116.

Methodology

Figure 2:
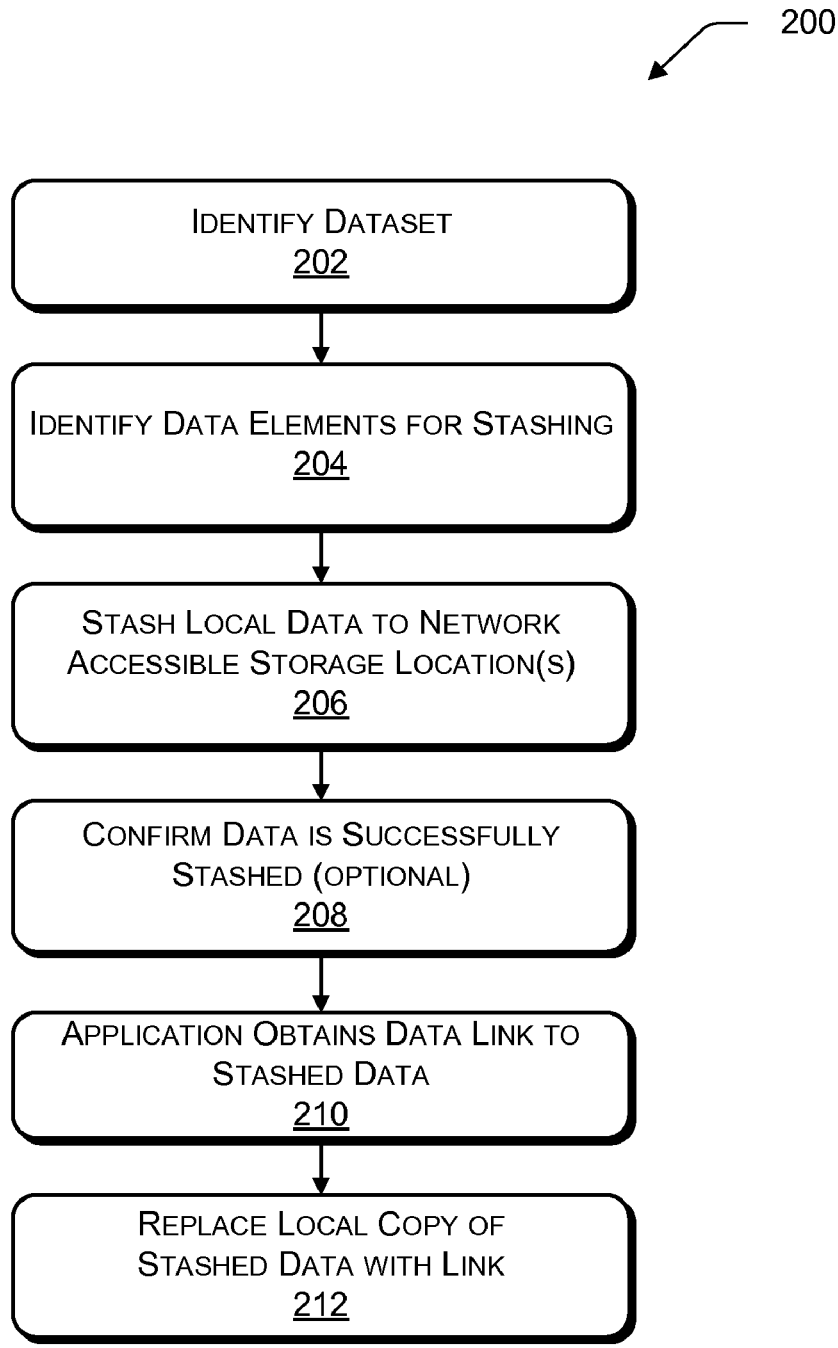
FIG. 2 shows an exemplary method of stashing local data managed by a backup system aware application onto one or more network accessible storage devices or locations.

FIG. 2 shows a flowchart of an exemplary process 200 by which a BSA application 102 acquires a data link 108 to stashed data 116. With reference to FIG. 2, the BSA application identifies a dataset 202 which contains local data 106. The dataset may be the entire local data associated or used by the BSA application, or the dataset may be just a part of the data associated with or accessible by the BSA application.

Next, the BSA application, a system component, or combination of components and the BSA application identify data elements for stashing 204. The identifying includes evaluating one or more characteristics of each data element of the dataset. One such characteristic would be the length of time since a user last accessed a data element. Another characteristic might be the frequency with which the data element is accessed. A combination of characteristics may also be used. For example, in an exemplary implementation, a combination of staleness and size of each data element is used to identify which data elements are appropriate candidates for stashing onto a NAS location or device. Such a combination may be used to find a statistically significant indicator that a data element of a BSA application may not likely be accessed again by a user. In such a situation, it does not make sense for the BSA application to have to actively keep a local copy of such data element, but could effectively stash such data element for some unlikely future access. Such a distinction could be labeled as indentifying "cold" data or identifying "hot" data that is used frequently and then having the BSA application stash the non-hot local data.

In one particular embodiment, if a system component across a network performs some or all of the identifying 204, the one or more characteristics of the data elements of the dataset is passed to the system component. The transfer of the one or more characteristics is performed in a batch on an intermittent basis, such as at a frequency of once a day. Alternatively, the BSA application continuously processes data elements and transfer characteristics of data elements as the BSA application used.

The identification also includes determining a granularity at which to identify exactly what is to be considered a data element. Such determination may be done once, many times, or may be configured at design time or by a user at runtime. For example, if the BSA application is an email application, an identifying function or step may determine an optimum granularity for data elements as at the level of a single email message, an email thread, or at the level of email message fields or message parts such as text body, attachments and headers. A data element may thus be a single email message, a complete email thread, or a definable portion of the message such as a text body, attachment, or message header. In this example, if the granularity is at the level of an email message field, the BSA application may determine that it can keep just one local copy of a particular attached file where several messages include the particular attached file. All copies of the particular attached file beyond the first copy could be stashed and replaced by a link. Other efficiencies in this example are possible. In general, a BSA application may determine the granularity of data elements as smaller, the same, or larger than the granularity of a traditional file.

The process continues by stashing identified local data to one or more NAS locations. Stashing includes determining an optimal way to transfer the identified data elements across a network. In one example, if data transfer speed or volume is a limitation or source of increased cost in the system, such optimizing includes calculating how to reduce the actual number of packets or bytes of data transferred to the NAS locations or devices. In this example, duplicate data elements may be sent just one time. Transfer of identified data elements may be done on a data element by data element basis intermittently, or it may be done in a batch. In one implementation, the identifying of the dataset, the identifying of the data elements within the dataset, and the transfer of identified data elements is done automatically, without user interaction or without notifying the user that such actions are taking place.

Once the stashing is complete, the process continues by having a network component confirm that transferred data was successfully stashed in at least one NAS location or device 208. Confirmation may involve sending a confirmation to the BSA application. In one implementation, sending a confirmation is optional.

The process also includes having the BSA application obtain one or more links to each stashed data element 210 or to each batch of data elements. In one implementation, the steps of receiving confirmation of successful stashing and obtaining a link to data elements may be combined such that when the BSA application receives one or more data links to each data element, or batch of elements, the BSA application treats receipt of such links as confirmation that the data has been successfully stashed.

Next, the BSA application replaces the local copy of data elements with one or more data links for each data element. In one implementation, only portions of information from within each link are used to replace the local copy of data elements.

Each data link is comprised of various pieces of information. In one implementation, each data link includes an address that represents the remote location where the actual data resides along with metadata that characterizes the stashed data element's content. The BSA application can use this reduced representation of content when various functions of the BSA application are used against the stashed data elements.

For example, if the BSA application is an email application, if a user performs a text search for a particular string and wishes to search within the body of all messages, and assuming that some messages have been stashed in a NAS location, then the search would still be able to return a reasonably accurate set of search results even across stashed data elements. Each data link to a data element would effectively include, within the data link or as separate data, information that allows the BSA application to search and otherwise use the data link as if it were the original data. In this example, the text search would still be effective as if the data elements, which were previously stashed, were still local data. In an alternative embodiment, the BSA application would prompt or offer an option for a user to have the search extend across the network and trigger a search of both local data and stashed data where the results would include a mechanism to access both local data and stashed data.

There are many benefits resulting from successfully stashing data of any BSA application. First, the need for local storage is reduced for any particular BSA application. Further, operating BSA applications on a particular device frees up local computer readable storage for other applications operating on the device. BSA applications are able to launch and operate faster, when compared against similarly functioning non-BSA applications, by having a smaller set of data to manage.

Features of System

FIG. 1 shows features of a system 100 that provides support for stashing of local data. With reference to FIG. 1, the BSA application 102, a component of the system 118, or a combination of the BSA application 102 and one or more components of the system 118, determine how best to identify and stash data. In one implementation, a BSA application 102 creates data storage space savings by stashing data seamlessly and without active participation by a user of the BSA application 102.

Stashing of local data, as used herein, includes but is not limited to merely storing, offloading, transferring, copying, moving, or backing up of data. Stashing of local data is preferably done when storage on a NAS device or location is more economical than storing data on a local device. Other factors may be taken into account such as, but not limited to, local device performance and ability, local volume of data storage, and performance of a particular BSA application in view of the amount of application data that the BSA application manages. One such factor is redundancy which can translate into availability of stashed data. A local device may have data stored on a single disk whereas the storage on a NAS device or location could provide RAID 1 or RAID 5 data redundancy.

In a preferred implementation, the NAS device or location is a LOB store that has been configured to optimize stashed data as raw characters or bytes of data associated with a particular BSA application in a clob or blob array, uninterpreted string of bytes, or other data structure such as a container. The BSA application data is transferred and placed in a same or similar container or in an entirely different container or set of containers. Once the data from a particular BSA application is transferred, it may be optimized. Optimization in this context includes minimizing the amount of space actually used by a NAS device to store stashed data, and reducing to an optimum number of copies of data elements of the stashed data for purposes of redundancy or optimal access by a particular BSA application. Optimization also includes the association of the stashed data with appropriate metadata. Other features of optimization in this context are possible.

The stashing of local data to one or more NAS locations or devices may be managed or performed, in whole or in part, by an application programming interface or API. Such API could receive calls from a BSA application, trigger identification of data elements, assist in stashing and confirming of stashing of local data, and could return a data link to the BSA application.

The process of stashing data may involve notifying a BSA application that an identical copy of a data element that the BSA application is managing is already available on one of the NAS devices. In such circumstance, notification may take the form of a data link to the identical item and the BSA application may be then replace the local copy of the data element with the data link.

In an alternative implementation, the process of identifying a dataset and identifying data elements involves the use of a policy or policy component in the system. A policy module or component would manage one or more policies for any particular BSA application for one or more users operating one or more devices. A policy may exist as part of the local data managed by the BSA application or may be stored on one of the NAS devices or across multiple NAS devices. A policy for a particular BSA application stores the criteria for identifying which characteristics of the data elements to use for identifying which data elements to stash. The policy could either be determined automatically by the BSA application or policy module, or could be originated, designated and/or adjusted by a user of the BSA application. The policy would depend on the particular BSA application in use. For example, a policy would store the characteristic of how stale a data element would be before the data element would be eligible for being a candidate for stashing. The use of a policy could be combined with heuristics to manage and stash data. Examples of heuristics include the use of data attributes such as frequency of access, time since last access, data size, ways in which data are used, and re-use of duplicate data. A policy could determine which heuristics are used to stash data remotely.

In another implementation, a BSA application would constantly or intermittently perform maintenance of one or more search indexes of local data and data links. The BSA application would then be able to quickly and efficiently provide quality search results and other data-intensive functions even though some of the local data had been transformed into data links. In contrast to indexing and indexes, the stashing of local data could be done on the same or less frequent basis as the maintenance of the indexing of BSA application data.

In an alternative implementation, the system for backup system aware applications provides an alternative to a file system. Local data is managed on the basis of data elements. The definition of a file element may be the same or different than a traditional file depending on a particular BSA application. A data element varies from one BSA application to another BSA application. If all applications on a particular device were BSA applications, a user would not then need to manage file backups or manage files because all local data would be fully backed up at least once to one or more NAS locations or devices, and portions of the local data would be stashed and exchanged for one or more data links. Such system would then obviate the need for a backup system and would simultaneously provide such benefits as, for example, increased application performance, increased device performance, and reduced need for data storage on the local device. Any BSA application could also be programmed to provide historical copies of data elements and versioning of data elements.

In yet another alternative implementation, each BSA application is also enabled to stash unused application functions. For example, in an email management application, if a user never uses a spell correction feature, this feature may be stashed onto a NAS device such as by stashing any related dynamic link libraries or other elements of the BSA application that can be separated from the BSA application. Such separation of functions from the actively used version of the BSA application can provide, for example, increased speed of execution and launching of the particular BSA application.

Exemplary BSA Application—Photo Manager

One exemplary BSA application is a BSA photo application that intelligently manages digital photographs and photo assets using the techniques described above. Such a BSA photo application would confirm that there is at least one remote copy of every digital photograph to serve as a backup for that photograph independent of how often the photograph is accessed. The BSA photo application would keep semantically meaningful versions of each digital photograph as determined by a policy. The policy could be modified by a user or could be pre-configured. The BSA photo application would save each digital photograph as an original plus a representation of the algorithms necessary to create all derived versions (e.g. a copy with red eye reduction, a copy with auto correction of color); such feature would both promote efficient storage and enable better algorithms to be applied as algorithms are developed.

BSA Application Programming Interface

Figure 3:
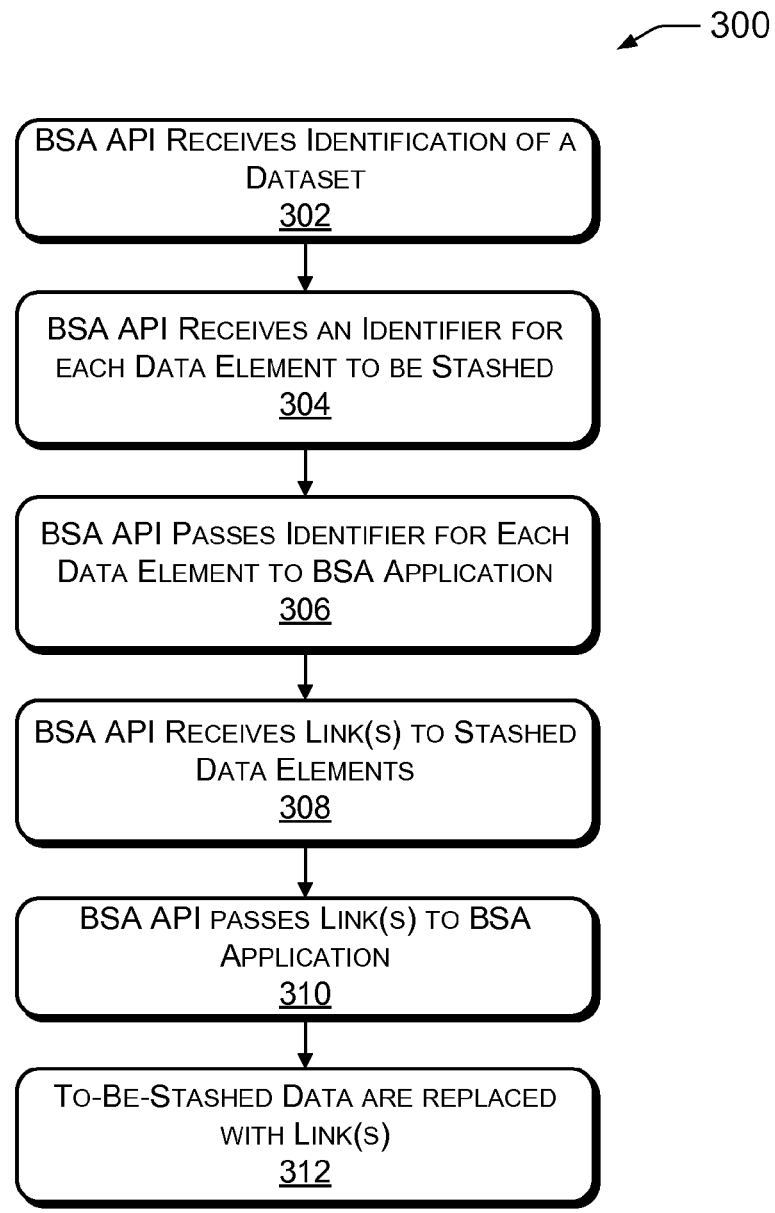
FIG. 3 shows an exemplary method by which to stash data through the use of a backup system aware (BSA) application programming interface (API).

In an exemplary implementation, stashing of data is accomplished through a BSA application programming interface (API). FIG. 3 shows a flowchart of an exemplary process 300 by which a BSA API facilitates stashing—including the communication between a BSA application and a storage device or storage location.

With reference to FIG. 3, the BSA API receives identification of, or identification data associated with, a data set that is accessible by a BSA application, the data set being subject to being stashed in a storage device or storage location 302. Next, the BSA API receives an identifier for each of one or more data elements of the data set to be stashed 304. The BSA API passes an identifier for each of the one or more data elements 306 to the BSA application, either singly or in a batch. In return, the BSA API receives a link to the stashed data elements from the storage device or device location 308. The link may be a link to the data elements in bulk or to each individual data element or to groups of data elements. The BSA API passes the link or links to the BSA application 310. The to-be-stashed data elements are then stashed in the storage device or storage location. The to-be-stashed data is then replaced with the link or links to the stashed data 312.

Network Storage

The benefits of a system which includes multiple users operating a same BSA application are not limited to a BSA application or the device operating the particular BSA application. The NAS location or device also incurs benefits. For example, in one exemplary implementation, a data link for a particular data element may contain a globally unique identifier. A NAS location may send a data link corresponding to the particular data element to more than one user and to each corresponding BSA application. Thus, the system only has to store a single copy of the data element or BSA application element that is common to each BSA application.

In another exemplary implementation, application data is stashed, written once, and not changed or overwritten again. The NAS location or device becomes a form of relatively permanent storage or archive of data elements.

In yet another exemplary implementation, a NAS location or device maintains multiple versions of particular data elements, but only the incremental changes to an original data element are saved.

Illustrative Computing Device

Figure 4:
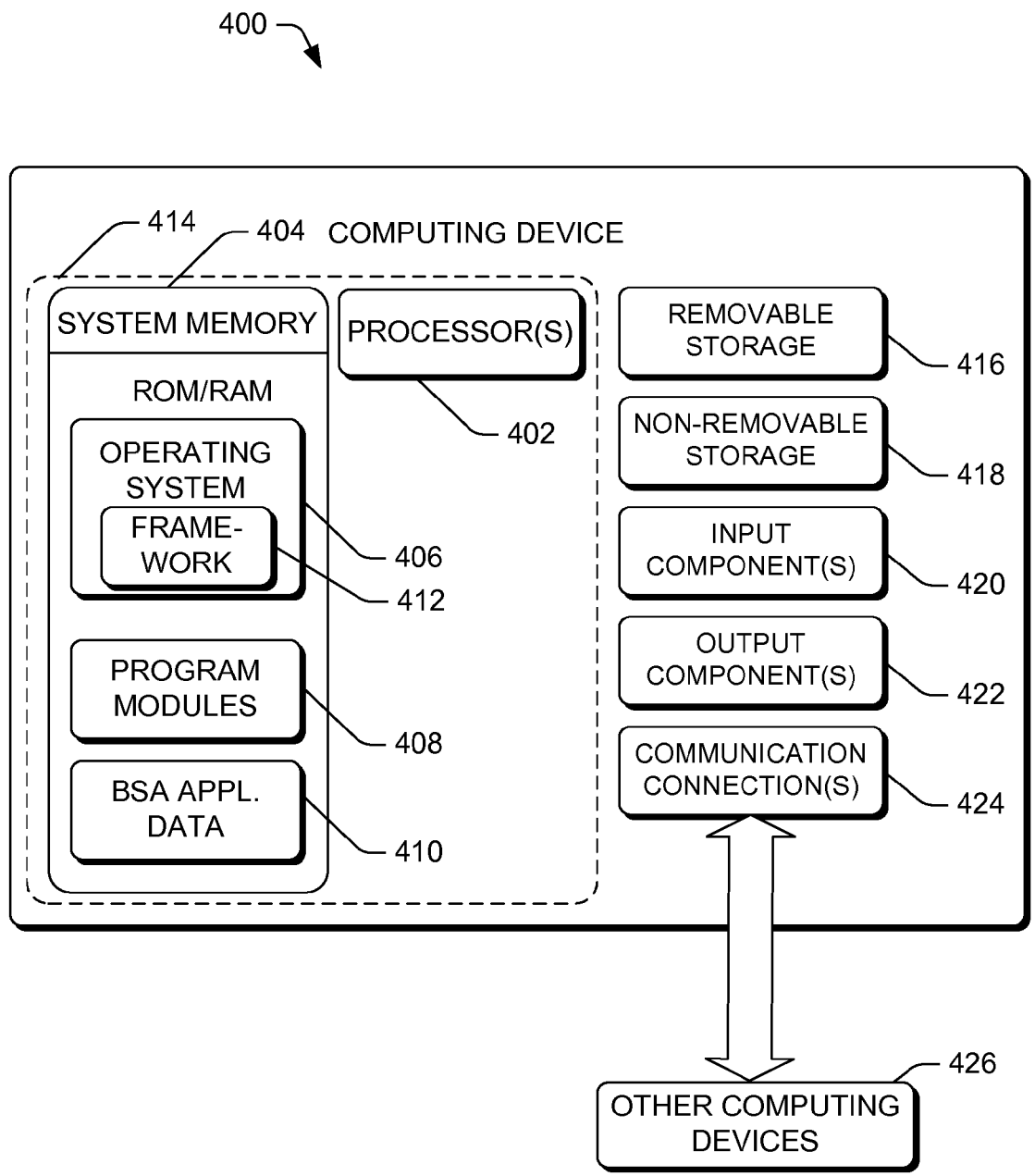
FIG. 4 shows an exemplary computing device on which a backup system aware application may operate.

FIG. 4 is a block diagram of an illustrative computing device 400 that may be used to implement speculative execution of imperative code and speculative data transfer of content as shown in the environment of FIG. 1. It will readily be appreciated that the various embodiments of techniques and mechanisms of stashing data may be implemented in other computing devices, systems, and environments. The computing device 400 shown in FIG. 4 is only one example of a computing device and is not intended to suggest any limitation as to the scope of use or functionality of the computer and network architectures. The computing device 400 is not intended to be interpreted as having any dependency or requirement relating to any one or combination of components illustrated in the example computing device.

In a very basic configuration, the computing device 400 typically includes at least one processing unit or processor 402 and system memory 404. Depending on the exact configuration and type of computing device, the system memory 404 may be volatile (such as RAM), non-volatile (such as ROM, flash memory, etc.) or some combination of the two. The system memory 404 typically includes an operating system 406, one or more program modules 408, and may include BSA application data 410 such as local data and data links as described herein. A program module 408 may alternatively referred to as a component or application component of a BSA application. The operating system 406 includes a component-based framework 412 that supports components (including properties and events), objects, inheritance, polymorphism, reflection, and may provide an object-oriented component-based application programming interface (API) for supporting the functionality and techniques described herein. The computing device 400 may be of a very basic configuration as demarcated by a dashed line 414. Again, a terminal may have fewer components but interacts with a computing device that may have such a basic configuration.

The computing device 400 may have additional features or functionality. For example, the computing device 400 may also include additional data storage devices (removable or non-removable, or some combination of removable and non-removable). Such additional storage is illustrated in FIG. 4 by removable storage 416 and non-removable storage 418. Computer storage media may include volatile and nonvolatile, removable and non-removable media implemented in any method or technology for storage of information, such as computer readable instructions, data structures, program modules, or other data. The system memory 404, the removable storage 416, and the non-removable storage 418 are all examples of computer storage media. The computing device 400 may also have input device(s) 420 (e.g., keyboard, microphone) and output device(s) 422 (e.g., display, speakers).

The computing device 400 may also contain communication connections 424 that allow the device to communicate with other computing devices 426 (e.g., storage device(s) 112), such as over a network 110. The network(s) 110 may include wired networks as well as wireless networks. The communication connections 424 are one example of communication media. The communication media may typically be embodied by computer readable instructions, data structures, program modules, etc.

The illustrated computing device 400 is only one example of a suitable device and is not intended to suggest any limitation as to the scope of use or functionality of the various embodiments described. Other well-known computing devices, systems, environments or configurations that may be suitable for use with the implementations described herein include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, or the like, or any combination of such exemplary devices. For example, some or all of the components of the computing device 400 may be implemented in a networked computing environment, such that resources or services are made available via a computer network for selective use by client devices.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
under control of one or more processors configured with executable instructions,
identifying data to be stashed based on one or more criteria, the to-be-stashed data forming part of a data set that is locally persisted on a device and accessible by an application;
stashing the to-be-stashed data in a network accessible storage that is remote from and accessible to the device;
replacing the to-be-stashed data with a link to the stashed data, the link comprising information that enables the application to perform a text search of the link to obtain search results without searching the stashed data.

2. Computer-readable storage media including instructions executable by one or more processors to perform operations comprising:
identifying data to be stashed, the data part of a data set that is stored on the computer-readable storage media and accessible to a device;
stashing, by an application programming interface, the data in a remote storage device that is accessible to the device by a network;
replacing the to-be-stashed data with a link to the stashed data, the link including data that enables the application to perform a search of the link to obtain search results without searching the stashed data.

3. A device comprising:
one or more processors; and
computer-readable storage media including instructions executable by the one or more processors to perform operations comprising:
identifying, based on one or more criteria, data to be stashed in a network accessible storage location;
stashing the data in the network accessible storage location;
receiving a link to the stashed data; and
replacing the data with a link corresponding to the stashed data, the link including information that enables the application to perform a text search of the link to obtain search results without searching the stashed data.

4. The method of claim 1, wherein the identifying, the stashing, and the replacing are performed by the application.

5. The method of claim 1, wherein the identifying is performed by a component operating at a location remote from the device and accesses the data to be stashed across a portion of network.

6. The method of claim 1, the method further comprising receiving the one or more criteria for the identifying from a user.

7. The method of claim 1 further comprising, after the stashing and before the replacing of the to-be-stashed data, receiving a confirmation indicator that the to-be-stashed data has been successfully stashed in the network accessible storage.

8. The method of claim 1, wherein the identifying comprises establishing a policy to persist a data set based on the one or more criteria, and wherein the one or more criteria include a granularity for the identifying of the to-be-stashed data.

9. The method of claim 1 further comprising:
after the replacing, retrieving the stashed data through the use of the link to the stashed data.

10. The computer-readable storage media of claim 2, wherein the data is identified by a component that accesses the data across a portion of network.

11. The computer-readable storage media of claim 2, the operations further comprising receiving one or more criteria from a user, the one or more criteria used to identify the data that is to be stashed.

12. The computer-readable storage media of claim 2, the operations further comprising receiving the link to the stashed data to confirm that the data was stashed in the remote storage device.

13. The computer-readable storage media of claim 2, the operations further comprising receiving a notification that the stashed data is identical to previously stashed data that is stored in the remote storage device.

14. The device of claim 3, wherein the link includes an identifier that is unique across networks to which the device has access.

15. The device of claim 3, wherein the data that is to be stashed is identified is performed by a second device that accesses the data across a portion of a network.

16. The device of claim 3, wherein the one or more criteria include a granularity for identifying the data that is to be stashed.

17. The device of claim 3, wherein at least one of the one or more criteria are received from a user associated with the device.

18. The device of claim 3, the operations further comprising stashing additional data at a frequency that is based on a rate at which the additional data increases over time.

19. The device of claim 3, the operations further comprising stashing additional data in additional storage locations, a number of the additional storage locations based on a rate at which the additional data increases over time.

20. The method of claim 6, wherein the link to the stashed data is sent from the network accessible storage, and wherein the link serves as the confirmation indicator.

* * * * *